United States Patent
Elder et al.

(10) Patent No.: US 7,659,698 B2
(45) Date of Patent: Feb. 9, 2010

(54) SYSTEM AND METHOD FOR CONTROLLING A STATE OF CHARGE OF AN ENERGY STORAGE SYSTEM

(75) Inventors: Ronald Elder, Livonia, MI (US); Steven Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 454 days.

(21) Appl. No.: 11/537,817

(22) Filed: Oct. 2, 2006

(65) Prior Publication Data

US 2008/0084186 A1      Apr. 10, 2008

(51) Int. Cl.
*H02J 7/00* (2006.01)
(52) U.S. Cl. .......................... 320/132; 701/22
(58) Field of Classification Search ................. 320/132; 701/22, 36
See application file for complete search history.

(56) References Cited

U.S. PATENT DOCUMENTS

| | | | |
|---|---|---|---|
| 5,778,326 A | 7/1998 | Moroto et al. | |
| 6,314,347 B1 | 11/2001 | Kuroda et al. | |
| 6,381,522 B1 | 4/2002 | Watanabe et al. | |
| 6,470,983 B1 | 10/2002 | Amano et al. | |
| 6,487,477 B1 | 11/2002 | Woestman et al. | |
| 6,561,295 B1 | 5/2003 | Kuroda et al. | |
| 6,687,581 B2 | 2/2004 | Deguchi et al. | |
| 6,687,607 B2 | 2/2004 | Graf et al. | |
| 6,856,866 B2 | 2/2005 | Nakao | |
| 2004/0030471 A1 | 2/2004 | Faye | |
| 2007/0181354 A1* | 8/2007 | Andri | 180/65.2 |

* cited by examiner

*Primary Examiner*—Edward Tso
*Assistant Examiner*—Ramy Ramadan
(74) *Attorney, Agent, or Firm*—David B. Kelley; Brooks Kushman P.C.

(57) ABSTRACT

A system and method for controlling the state of charge of an energy storage system examines a number of parameters to determine if a target state of charge should be adjusted. Parameters related to one or more of: a target life span of the energy storage system, driving habits of a vehicle operator, or environmental conditions are examined. The target state of charge is changed from a predetermined baseline target state of charge when the parameter values meet predetermined conditions.

21 Claims, 2 Drawing Sheets

SYSTEM AND METHOD FOR CONTROLLING A STATE OF CHARGE OF AN ENERGY STORAGE SYSTEM

BACKGROUND OF THE INVENTION

1. Field of the Invention

The present invention relates to a system and method for controlling a state of charge for an energy storage system.

2. Background Art

With the ever increasing need to produce vehicles that are more fuel efficient, hybrid electric vehicles (HEV's) have provided an improvement in fuel economy over many conventional vehicles that utilize only an internal combustion engine to drive the vehicle. One of the primary advantages of an HEV is that it allows the vehicle to be powered by one or more electric motors under certain operating conditions. For example, if the speed of the vehicle is relatively moderate, and the battery or other electrical power sources sufficiently charged, the engine may be shut off, and the vehicle powered exclusively by the electric motors. As operating conditions change, the engine may be started to provide additional power, and if needed, operate a generator to charge the battery.

In order to ensure that the battery has enough power to perform desired functions—e.g., operate a generator to start the engine, or provide power to a motor to provide torque to the vehicle wheels—a state of charge of the battery is maintained within a predetermined range. For example, if the state of charge drops below a certain value, the engine may be started to drive a generator to charge the battery. Operation of the engine consumes fossil fuel, and produces undesirable emissions.

Conversely, if the state of charge rises above a certain level, additional charging may be undesirable. In such a case, additional charging of the battery is rejected. Therefore, if the vehicle is slowed or stopped—a situation that may typically call for the capture of regenerative braking energy—the vehicle's friction brakes may be used so that the battery is not overcharged. This is inefficient, as the energy available from the braking operation is lost.

Therefore, a need exists for a system and method for controlling the state of charge of an energy storage system, such as a battery, so that it is allowed to drop below some predetermined baseline if it is known or contemplated that charging operations will be occurring. Similarly, it would be desirable for the system and method to allow the state of charge to rise above the baseline if it is known or contemplated that the stored energy will be used.

SUMMARY OF THE INVENTION

Accordingly, the present invention provides a system and method for controlling the state of charge of an energy storage system. Embodiments of the system and method examine a variety of conditions to determine if a target state of charge (SOC) should be adjusted from a baseline target SOC. For example, one or more parameters may be examined, and a value of the parameter or parameters determined, to provide information as to whether the target SOC should be adjusted.

The parameters examined may be chosen from one or more categories, such as categories containing information related to vehicle operator driving habits, the expected life span of the energy storage system, environmental conditions, or traveling conditions. With regard to the first of these, vehicle operator driving habits, such information can be useful, since a vehicle may be operated more efficiently by maintaining a certain state of charge if one driver is operating the vehicle, and it may be operated more efficiently by maintaining a different state of charge if another driver is operating the vehicle. For example, if a driver is known to accelerate quickly, it may be desirable to have additional battery charge available to operate a motor to augment engine torque to accelerate the vehicle.

In addition to the foregoing, a driver may be known to brake very quickly. In such a case, less regenerative braking energy may be captured than if the driver braked more slowly. Again, it may be beneficial to maintain a target SOC above a baseline target SOC, since it will be contemplated that less regenerative braking energy will be available to charge the battery. Driving habits such as these can be stored, for example, in a vehicle system controller, which may also maintain information about seat positions or other particulars of a driver. Communication with the controller as to which driver is operating the vehicle can be facilitated, for example, by actuating a button on a key fob when the driver opens the vehicle.

The expected life span of an energy storage system, such as a battery, may be dependent on a number of factors, including how the system is operated. For example, if a battery is operated such that the state of charge is maintained over a relatively narrow range, it may have a relatively long life. Conversely, a battery that is operated such that the SOC is allowed vary significantly within a wide range of states of charge may have a shorter life span. How the battery is operated is typically a decision for the original equipment manufacturer (OEM) of the vehicle. For example, if the OEM wishes to increase the life span of the battery, it may decrease the range in which the target SOC resides.

Although the expected life span of the battery may be improved by such operation, the engine will likely operate more frequently, since the configuration will allow little variation in the operating SOC. Thus, the present invention provides a system and method for adjusting the range in which the target SOC resides in order to provide an expected life span for the battery desired by the vehicle owner. If, for example, the vehicle owner desires a greater life span for the battery, the range in which the target SOC resides can be set to be relatively narrow. Conversely, if the owner desires greater fuel economy and lower emissions, the range can be increased.

In addition to increasing or decreasing the range—i.e., adjusting its width—the entire range can be adjusted upward or downward. This can in conjunction with adjusting the target SOC. For example, the target SOC may be increased or decreased within the operating range of states of charge. In some cases, however, the adjustment to the target SOC may push the target SOC outside the preexisting range, in which case the range would be adjusted. Even if the adjusted target SOC is within the preexisting range, it may be beneficial to appropriately adjust the entire range so the target SOC is approximately centered within the range.

Embodiments of the system and method of the present invention may also examine parameters in a category of environmental conditions. For example, if a vehicle operator chooses a maximum air conditioning setting, the control systems in some HEV's forces the engine to stay on. This helps to ensure that an energy storage system, such as a battery, is not overly discharged. In such situations, it is possible to allow the target battery SOC to be reduced, since the engine is already running, and is immediately available to operate a generator to charge the battery.

Similarly, if the temperature of the ambient air outside the vehicle is such that use of a maximum air conditioning setting is contemplated, the target battery SOC may be reduced, since it is expected that the engine will be forced on when the air conditioning is activated. Other systems may also force the engine on, depending on how the HEV control system is configured. For example, if the vehicle headlights are turned on when other electrical systems are in use, the added electrical load of the headlights may cause the engine to be operated. This could occur even if the battery SOC is relatively high and the engine would not otherwise be started. The present invention, therefore, includes a system and method for reducing the target SOC when there are heavy electrical loads, or when such loads are anticipated—for example, when there are electrical systems in use, and an ambient light sensor detects that the use of the headlights is expected.

Traveling conditions can also be used to provide information for controlling the battery SOC. For example, parameters related to changes in elevation of the terrain or traffic conditions may be examined. The conditions of the terrain can be input, for example, by inputting a known driving route into a navigation system. In other embodiments, a global positioning system (GPS) may be used to determine the conditions of the terrain in real time. Similarly, traffic conditions can be reported to a vehicle control system through one of a number of known information systems currently in use.

The system and method of the present invention can use this information to determine an appropriate target SOC. For example, if it is known that there will be a long decline in elevation, the target SOC can be reduced, since it is contemplated that there will be an opportunity to capture a large amount of regenerative energy during the descent. Conversely, if a long incline is contemplated, the target SOC may be increased to provide more available energy to the motor during the ascent. Information regarding construction zones or congested traffic can also be used, since there will likely be more braking in such areas. Hence, the target SOC can be reduced in these situations as well.

In addition, a driver may input a distance until a driving cycle is complete—i.e., how many miles until a destination is reached and the vehicle shut off. If the distance is above some predetermined distance, the target SOC can be decreased, since there will be ample opportunity to recharge the battery prior to the destination being reached. Conversely, if the destination distance is below the predetermined distance, the target SOC may be adjusted upward to ensure that there is ample battery charge when the vehicle is shut off. This helps to ensure that there will always be battery power available to start the vehicle.

The present invention also provides a method for controlling a state of charge of an energy storage system in a vehicle. The vehicle has an engine and a vehicle control system, and the energy storage system has a target state of charge that is adjustable from a baseline target state of charge. The method includes inputting to the vehicle control system information related to at least one of driving habits of a vehicle operator, or environmental conditions. In addition, information related to current traveling conditions for the vehicle is input to the vehicle control system. The target state of charge of the energy storage system is adjusted based on at least one of the inputs to the vehicle control system.

The invention further provides a method for controlling a state of charge of an energy storage system in a vehicle having an engine. The energy storage system has a target state of charge that is adjustable from a baseline target state of charge. The method includes determining a value of at least one parameter for adjusting the target state of charge of the energy storage system. The at least one parameter is related to at least one of driving habits of a vehicle operator, or environmental conditions. It is determined whether a change in the target state of charge from the baseline target state of charge is desired based on the at least one determined parameter value. The target state of charge is changed from the baseline target state of charge when it is determined that a change in the target state of charge is desired.

The invention also provides a control system for controlling the state of charge of an energy storage system in a vehicle having an engine. The energy storage system has a target state of charge that is adjustable from a baseline target state of charge. The system includes a controller operatively connected to the energy storage system and configured to receive inputs related to at least one of driving habits of a vehicle operator, or environmental conditions. The controller is further configured to receive inputs related to current traveling conditions for the vehicle, and to adjust the target state of charge from the baseline target state of charge based on the inputs received.

DETAILED DESCRIPTION OF THE PREFERRED EMBODIMENT(S)

Figure 1:
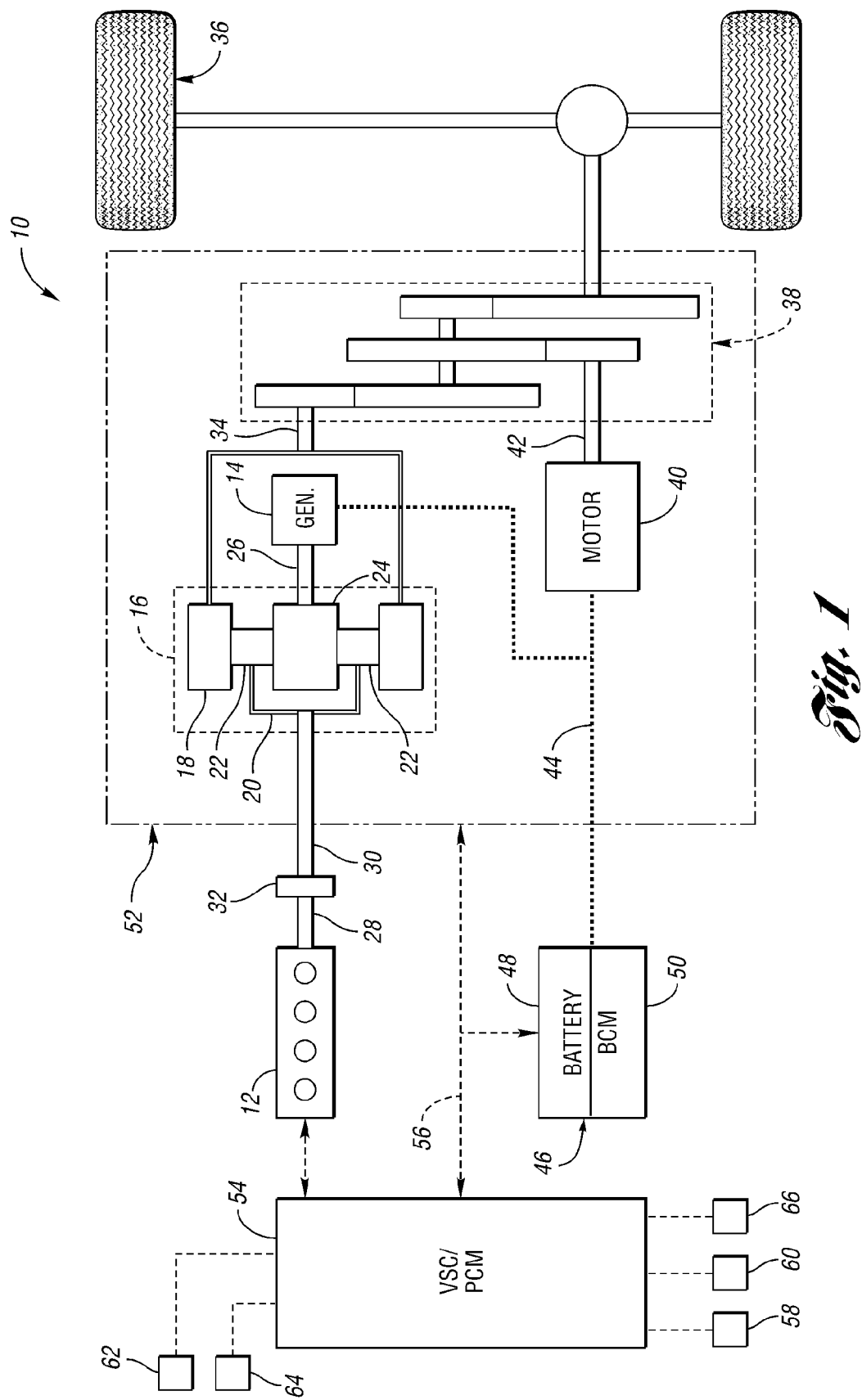
FIG. 1 shows a schematic representation of a hybrid electric vehicle including a control system in accordance with the present invention.

FIG. 1 shows a schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 48—i.e., the generator 14 and motor 40—a vehicle control system, shown generally as controller 54, is provided. As shown in FIG. 1, the controller 54 is a vehicle system controller/powertrain control module (VSC/PCM). Although it is shown as a single controller, it may include multiple controllers. For example, the PCM portion of the VSC/PCM 54 may be software embedded within the VSC/PCM 54, or it can be a separate hardware device.

A controller area network (CAN) 56 allows the VSC/PCM 50 to communicate with the transmission 52 and the BCM 50. Just as the battery 48 includes a BCM 50, other devices controlled by the VSC/PCM 54 may have their own controllers. For example, an engine control unit (ECU) may communicate with the VSC/PCM 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a vehicle control system for the vehicle 10.

The VSC/PCM 54 is configured to receive a number of inputs that provide information related to controlling an SOC for the battery 48. For example, information related to driving habits of a vehicle operator may be input from an accelerator pedal sensor 58 and a brake pedal sensor 60. Similarly, environmental conditions may be input through an ambient air temperature sensor 62 and an ambient light condition sensor 64. A heating, ventilation, and air conditioning system 66 is also operatively connected to the VSC/PCM 54. In this way, the VSC/PCM will be signaled if a maximum air conditioning setting is chosen.

Figure 2:
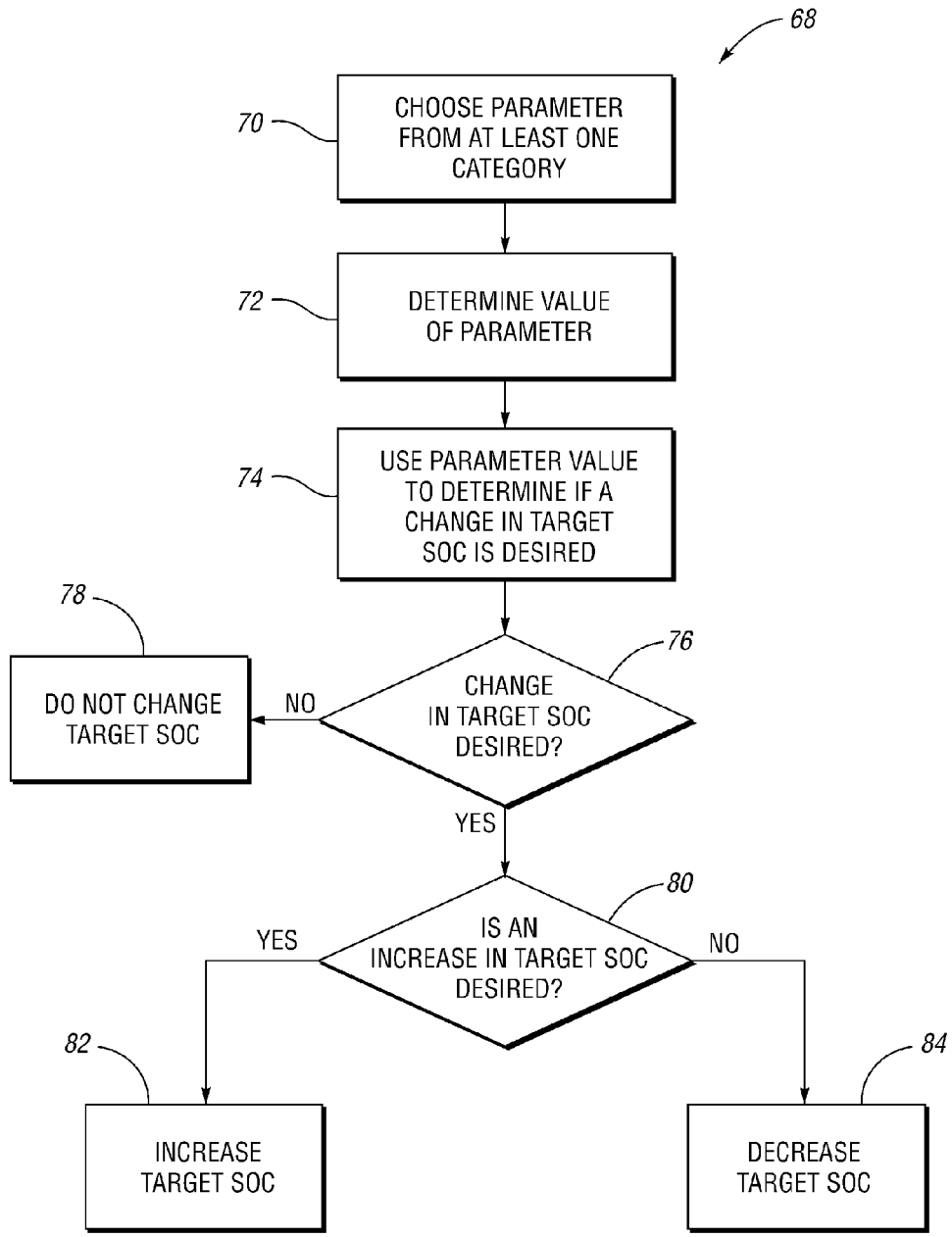
FIG. 2 shows a flow chart illustrating a method of the present invention.

The VSC/PCM 54 is configured to execute a method of the present invention, one embodiment of which is illustrated in the flow chart 68 shown in FIG. 2. At step 70, at least one parameter is chosen from at least one category. As discussed above, this can be a parameter related to, for example, a desired or expected life span of the battery 48. The parameter can be chosen to be related to the driving habits of a vehicle operator, environmental conditions, traveling conditions, or some combination thereof.

Although the examples described above discuss the use of a single parameter in the determination of whether to adjust the target SOC, it is understood that more than one such parameter may be used. For example, the parameter related to driving habits may indicate a desire to increase the target SOC, and if this parameter is used alone, the target SOC will be increased. If another parameter is examined, for example, one related to environmental conditions, and this parameter also indicates that an increase in the target SOC is desired, then the target SOC will be accordingly adjusted. Conversely, if the parameter related to environmental conditions indicates that a decrease in the target SOC is desired, then, for example, an arbitration scheme may be used. In such a case, both parameters could be considered, with different weights assigned to each to determine which parameter should control.

At step 72 it is determined what the value of the chosen parameter is. For example, if the chosen parameter is the temperature of the ambient air outside the vehicle 10, then the value of the parameter would be the measured temperature. If the chosen parameter is the expected or desired life span of the battery 48, the value would be the life span indicated as a certain length of time. Similarly, if the chosen parameter is an environmental condition, such as the level of ambient light outside the vehicle 10, then the parameter value will be a number indicating whether the ambient light is below a predetermined level.

For other chosen parameters, corresponding values can be determined. For example, if the parameter is related to the driving habits of a vehicle operator, the value may be an average braking time. As discussed above, this can be determined, for example, by the brake pedal sensor 60. If the parameter is temperature, then the value may be the temperature of the ambient air outside the vehicle 10.

At step 74, it is determined whether the parameter value indicates that a change in the target SOC is desired. As explained above, the value of the parameter may indicate that an increase or a decrease in the target SOC is desired. For example, if the parameter value indicates that the driver tends to accelerate quickly, it may be desirable to increase the target SOC. Similarly, if the parameter value indicates that the driver tends to brake very quickly, it may again be desirable to increase the target SOC from the baseline SOC. Although different baseline SOC's can be used, a baseline SOC of approximately 50% has been found to be effective for some vehicles, such as the vehicle 10.

If the chosen parameter is related to a life span of the battery 48, it may be desirable to make an adjustment related to the target SOC. In such a case, however, the adjustment may be to the range in which the target SOC resides, rather than the target SOC itself. Thus, step 74 can be modified slightly to be: "use parameter value to determine if a change in the range of target SOC is desired." For example, if the expected life span of the battery 48 is chosen to be above a standard, it may be desirable to decrease the range, even though this means operating the engine more frequently. Where there is less concern for the life span of the battery 48, and the parameter value indicates a less than standard battery life span is expected, the range can be increased, thereby resulting in a more fuel efficient operation of the vehicle 10.

In addition, to the inputs describe above, a driver may input into the VSC/PCM 54 a distance to a destination. When the distance is above some predetermined distance, the target SOC can be decreased, and when it is below the predetermined distance, the target SOC may be increased. Other parameter values can be used by the VSC/PCM 54 as described above to make the determination at step 74.

At step 76, it is determined if a change in the target SOC is desired; where life span of the battery 48 is under consideration, it could be a change in the SOC range. If a change is not indicated, the method "terminates" at step 78. Although the method is said to terminate at step 78, it is understood that the method may be run continuously during operation of the vehicle, or at some predetermined frequency. If at step 76 it is determined that a change in the target SOC is desired, the method continues to step 80.

At step 80, it is determined whether an increase in the target SOC is desired. Again, in the case of the life span of the battery 48, the inquiry may be related to whether a change in the SOC range is desired. If a change is desired, the VSC/PCM 54 communicates this information to the BCM 50 to effect the change—see step 82. If, however, an increase is not desired, the method moves to step 84, and a decrease in the target SOC—or SOC range—is effected.

While the best mode for carrying out the invention has been described in detail, those familiar with the art to which this invention relates will recognize various alternative designs and embodiments for practicing the invention as defined by the following claims.

What is claimed:

1. A method for controlling a state of charge of an energy storage system in a vehicle having an engine and a vehicle control system, the energy storage system having a target state of charge that is adjustable from a baseline target state of charge, the method comprising:
   inputting to the vehicle control system information related to environmental conditions, including information related to a setting of a vehicle environmental control system;
   inputting to the vehicle control system information related to current traveling conditions for the vehicle; and
   adjusting the target state of charge from the baseline target state of charge based on at least one of the inputs to the vehicle control system, including reducing the target state of charge from the baseline state of charge when the vehicle environmental control system performs a function that forces the engine to operate.

2. The method of claim 1, the target state of charge of the energy storage system residing in a predetermined range of states of charge, the method further comprising:
   inputting to the vehicle control system information related to a target life span of the energy storage system;
   increasing the range in which the target state of charge resides when the target life span of the energy storage system is below a predetermined life span; and
   decreasing the range in which the target state of charge resides when the target life span of the energy storage system is above the predetermined life span.

3. The method of claim 1, further comprising inputting information to the vehicle control system related to the driving habits of a vehicle operator, the target state of charge being increased from the baseline state of charge when the driving habits of the vehicle operator indicate a pattern of fast accelerations and the vehicle environmental control system does not perform a function that forces the engine to operate.

4. The method of claim 1, further comprising inputting information to the vehicle control system related to the driving habits of a vehicle operator, the target state of charge being increased from the baseline state of charge when the driving habits of the vehicle operator indicate a pattern of fast braking operations and the vehicle environmental control system does not perform a function that forces the engine to operate.

5. The method of claim 1, wherein inputting information to the vehicle control system includes inputting information related to a temperature of an ambient environment outside the vehicle, the target state of charge being reduced from the baseline state of charge when the temperature of the ambient environment is above a first predetermined temperature or below a second predetermined temperature lower than the first predetermined temperature.

6. The method of claim 1, wherein inputting information to the vehicle control system includes inputting information related to an ambient light level outside the vehicle, the target state of charge being reduced from the baseline state of charge when the ambient light level is below a predetermined level.

7. The method of claim 1, wherein inputting information to the vehicle control system related to current traveling conditions includes inputting information related to a state of a driving cycle, the state of charge being increased from the baseline state of charge when a remaining time of the driving cycle is below a predetermined value and the vehicle environmental control system does not perform a function that forces the engine to operate.

8. A method for controlling a state of charge of an energy storage system in a vehicle having an engine, the energy storage system having a target state of charge that is adjustable from a baseline target state of charge, the method comprising:
   determining a value of at least one parameter for adjusting the target state of charge of the energy storage system, one parameter of the at least one parameter being related to the driving habits of a vehicle operator;
   determining whether a change in the target state of charge from the baseline target state of charge is desired based on the at least one determined parameter value; and
   adjusting the target state of charge from the baseline target state of charge when it is determined that a change in the target state of charge is desired, including increasing the target state of charge from the baseline state of charge when the driving habits of the vehicle operator indicate a pattern of fast braking operations.

9. The method of claim 8, the target state of charge of the energy storage system residing in a predetermined range of states of charge, the method further comprising:
   determining a value of a parameter related to a target life span of the energy storage system;
   determining whether a change in the range is desired based on the parameter related to the target life span of the energy storage system;
   increasing the range when the parameter related to the target life span of the energy storage system indicates a target life span of the energy storage system that is below a predetermined life span; and
   decreasing the range when the parameter related to the target life span of the energy storage system indicates a target life span of the energy storage system that is above the predetermined life span.

10. The method of claim 8, wherein the target state of charge is increased from the baseline state of charge when the driving habits of the vehicle operator indicate a pattern of fast accelerations.

11. The method of claim 8, wherein another parameter of the at least one parameter is related to environmental conditions and includes a setting of a vehicle environmental control system, the target state of charge being reduced from the baseline state of charge when the vehicle environmental control system performs a function that forces the engine to operate and the driving habits of the vehicle operator do not indicate a pattern of fast braking operations.

12. The method of claim 8, wherein one other parameter of the at least one parameter is related to environmental conditions, and the value of the one other parameter includes a temperature of an ambient environment outside the vehicle, the target state of charge being reduced from the baseline state of charge when the temperature of the ambient environment is above a first predetermined temperature or below a second predetermined temperature lower than the first predetermined temperature and the driving habits of the vehicle operator do not indicate a pattern of fast braking operations.

13. The method of claim 8, wherein another parameter of the at least one parameter is related to environmental conditions and includes an ambient light level outside the vehicle, the target state of charge being reduced from the baseline state of charge when the ambient light level is below a predetermined level and the driving habits of the vehicle operator do not indicate a pattern of fast braking operations.

14. The method of claim 8, wherein another parameter of the at least one parameter is related to a state of a driving cycle, such that if a remaining time of the driving cycle is below a predetermined value, the state of charge is increased from the baseline state of charge.

15. A control system for controlling the state of charge of an energy storage system in a vehicle having an engine, the energy storage system having a target state of charge that is adjustable from a baseline target state of charge, the system comprising:
   a controller operatively connected to the energy storage system and configured to receive inputs related to environmental conditions, including information related to a setting of a vehicle environmental control system, the controller being further configured to receive inputs related to current traveling conditions for the vehicle, and to adjust the target state of charge from the baseline target state of charge based on at least one of the inputs received, including reducing the target state of charge from the baseline state of charge when the vehicle environmental control system performs a function that forces the engine to operate.

16. The control system of claim 15, the target state of charge of the energy storage system residing in a predetermined range of states of charge, the controller being further configured to:
   receive inputs related to a target life span of the energy storage system,
   increase the range in which the target state of charge resides when the target life span of the energy storage system is below a predetermined life span, and
   decrease the range in which the target state of charge resides when the target life span of the energy storage system is above the predetermined life span.

17. The control system of claim 15, wherein the controller is further configured to receive inputs related to the driving habits of a vehicle operator, the controller increasing the target state of charge from the baseline state of charge when the driving habits of the vehicle operator indicate a pattern of fast accelerations and the vehicle environmental control system does not perform a function that forces the engine to operate.

18. The control system of claim 15, wherein the controller is further configured to receive inputs related to the driving habits of a vehicle operator, the controller increasing the target state of charge from the baseline state of charge when the driving habits of the vehicle operator indicate a pattern of fast braking operations and the vehicle environmental control system does not perform a function that forces the engine to operate.

19. The control system of claim 15, wherein the inputs include information related to a temperature of an ambient environment outside the vehicle, the controller reducing the target state of charge from the baseline state of charge when the temperature of the ambient environment is above a first predetermined temperature or below a second predetermined temperature lower than the first predetermined temperature.

20. The control system of claim 15, wherein the inputs include information related to an ambient light level outside the vehicle, the controller reducing the target state of charge from the baseline state of charge when the ambient light level is below a predetermined level.

21. The control system of claim 15, wherein the inputs include information related to a state of a driving cycle, the controller increasing the state of charge from the baseline state of charge when a remaining time of the driving cycle is below a predetermined value and the vehicle environmental control system does not perform a function that forces the engine to operate.

\* \* \* \* \*